US006894604B2

United States Patent
Phillips et al.

(10) Patent No.: US 6,894,604 B2
(45) Date of Patent: May 17, 2005

(54) METHOD AND APPARATUS FOR OPERATING A VEHICLE SAFETY ARM

(75) Inventors: William R. Phillips, Belleville (CA); James A. Reavell, Campbellford (CA)

(73) Assignee: B.M.R. Mfg. Inc., Campbellford (CA)

( * ) Notice: Subject to any disclaimer, the term of this patent is extended or adjusted under 35 U.S.C. 154(b) by 1 day.

(21) Appl. No.: 10/609,517

(22) Filed: Jul. 1, 2003

(65) Prior Publication Data

US 2004/0232859 A1 Nov. 25, 2004

(30) Foreign Application Priority Data

May 21, 2003 (CA) .............................................. 2429282

(51) Int. Cl.⁷ ................................................ B60Q 1/26
(52) U.S. Cl. .................... 340/433; 340/425.5; 340/468; 335/209; 180/271; 180/281; 280/764.1
(58) Field of Search ................................ 340/930, 433, 340/480, 487–490, 648, 686.1; 318/626, 266, 282; 335/65, 68, 78, 205, 230

(56) References Cited

U.S. PATENT DOCUMENTS

| | | | | |
|---|---|---|---|---|
| 3,863,214 A | * | 1/1975 | Kerr, Jr. .................. | 340/932.1 |
| 4,559,518 A | * | 12/1985 | Latta, Jr. .................... | 340/433 |
| 4,697,541 A | * | 10/1987 | Wicker ...................... | 116/28 R |
| 4,816,804 A | | 3/1989 | Reavell | |
| 5,132,662 A | * | 7/1992 | Burch ......................... | 340/433 |
| 5,357,239 A | * | 10/1994 | Lamparter .................. | 340/433 |
| 5,406,250 A | | 4/1995 | Reavell et al. | |
| 5,635,902 A | * | 6/1997 | Hochstein ................... | 340/433 |
| 5,812,052 A | * | 9/1998 | Swanger et al. ............ | 340/433 |
| 6,765,481 B2 | * | 7/2004 | Haigh et al. ................ | 340/433 |
| 2003/0061982 A1 | | 4/2003 | Phillips et al. | |

* cited by examiner

Primary Examiner—Daniel Wu
(74) Attorney, Agent, or Firm—Dimock Stratton LLP; Mark B. Eisen

(57) ABSTRACT

An apparatus for operating a reciprocating arm vehicular safety device with a magnetized element for preventing inadvertent deployment of the reciprocating arm. The apparatus has a magnetized element on the arm and an electromagnet on a vehicle bumper, the magnetized element and electromagnet disposed so as to engage the arm in a retracted position. When the reciprocating arm is moved to an extended position, current is passed through the electromagnet to repel the magnetized element, thereby allowing the arm to move to the extended position by a motor.

21 Claims, 3 Drawing Sheets

METHOD AND APPARATUS FOR OPERATING A VEHICLE SAFETY ARM

FIELD OF THE INVENTION

This invention relates to safety devices. In particular, this invention relates to a method and apparatus for extending and retracting vehicle safety devices such as stop signs and crossing gates.

BACKGROUND OF THE INVENTION

Vehicles such as school buses serve to pick up and discharge passengers. When passengers are discharged from the front door of the bus to the side of a road, the passengers may attempt to cross the road immediately in front of the bus. This poses a safety risk, particularly with school-age children, as the road immediately in front of the bus may be in the bus driver's blind spot, i.e. outside the bus driver's range of vision. Accordingly, safety measures such as crossing gates mounted on the front of the bus have been employed for many years. An example is shown in U.S. patent application Ser. No. 5,406,250 issued Apr. 11, 1995 to Reavell et al., which is incorporated herein by reference.

These crossing gates are typically hinged to the front of the bus at the side nearest the front door. In the retracted state, the crossing gate is held parallel to the front of the bus. When the bus stops and the front door is opened, the crossing gate is extended until it is substantially perpendicular to the front of the bus, effectively providing a barrier at the side of the road of typically at least six feet. Discharged passengers who wish to cross the road must walk around the crossing gate, causing them to pass through the driver's range of vision. After the passengers have passed beyond the front of the bus, the crossing gate is retracted.

An example of a prior art retraction mechanism is U.S. Pat. No. 4,816,804 issued Mar. 28, 1989 to Reavell, which is incorporated herein by reference. The apparatus controlling the safety device, in the case of U.S. Pat. No. 4,816,804 a school bus stop sign, is automatically responsive to the opening and closing of the bus door such that when the door is opened, the apparatus swings the hinged sign to its extended position, and when the door is closed, the apparatus returns the sign to its retracted position. The apparatus comprises a unidirectional motor coupled to the hinged sign through an eccentric drive and a link arm. The link arm is provided with a preloaded, helical compression spring which absorbs the shock of mechanical leverage.

However, apparatus such as these do not prevent inadvertent deployment of the safety device. Although a compression spring in the link arm can help to prevent excessive forces from damaging the mechanical linkages on the safety device, it is not able to prevent unintended deployment of the safety device when the device is exposed to high winds. Wind may catch the safety device, especially in the case of a gate, and partially or fully deploy the gate or even damage the device. Particularly if the bus is in motion, such accidental deployment of the gate is a significant hazard. Even when the bus is parked, the gate is more susceptible to breakage and damage from high winds when extended inadvertently.

One solution to this problem has been to employ a magnetic device to hold or assist in holding a crossing gate in the retracted position. The magnet provides an advantage over mechanical holding devices, since there are no moving parts exposed to the elements and therefore the durability of a magnetic holding device is significantly greater than that of a mechanical holding device.

However, problems arise in the deployment of the gate to an extended position. In the case of a reciprocating arm which is of significant length, which is typical of a safety gate, it is difficult for the motor which moves the crossing arm to provide sufficient force to overcome the magnetic forces, so an electromagnetic device capable of deactivation must be used in order that the crossing gate can be released at the appropriate time to allow for extension of the crossing gate. Since the electromagnetic device is energized whenever the crossing gate is in the retracted position, in order to increase holding power of the crossing gate, the lifespan of the electromagnet is curtailed and the power supply is drained. This is not a satisfactory solution for use when the bus is not in operation and the power is shut off and parked, for example where high winds or storms strike overnight.

It would accordingly be advantageous to provide an electromagnetic device for engaging a reciprocating arm such as a safety gate which readily allows for the release of an arm of the safety gate from a retracted position. It would also be advantageous to provide a device for engaging a reciprocating arm such as a safety gate in a retracted position by a permanent magnetic device which does not require a constant power source when the reciprocating arm is in the retracted position. It would further be advantageous to provide a device for engaging a reciprocating arm such as a safety gate by a permanent magnetic device which is integrated with the operation of another safety gate such as a stop arm.

SUMMARY OF THE INVENTION

The present invention provides an apparatus for operating a vehicle safety device comprising a reciprocating arm, which allows the reciprocating arm to be held in a retracted position and released to an extended position. The reciprocating arm is mounted to a drive motor, which extends and retracts the arm, connected to a drive circuit. The reciprocating arm is held in a retracted position by the interaction of a magnetized element on either the reciprocating arm or the vehicle and a magnetic element on the other of the arm or the vehicle, and released by an electromagnet oriented in a polarity such that when activated the electromagnet repels the permanent magnet. In the preferred embodiment the magnetic element is provided by a component (for example the core) of the electromagnet, but the magnetic element may be separate.

When the reciprocating arm is initially moved towards the deployed or extended position, a current passes through the electromagnet to repel the magnetized element and the drive circuit activates the drive motor to extend the reciprocating arm to the extended position. When the reciprocating arm is to be restored to the retracted position, the electromagnet is re-energized and the drive motor moves the arm towards the retracted position and the magnetized element is attracted to the electro magnet to hold the reciprocating arm in the retracted position. The invention further provides a means for sensing near proximity of the magnetized element to the electromagnet. The invention further provides for an apparatus for operating a plurality of vehicle safety devices such as a stop arm and a crossing arm.

The present invention thus provides an apparatus for operating a safety device on a vehicle comprising an arm having extended and retracted positions, comprising: a motor for moving the arm between the extended and retracted positions comprising a drive circuit for operating the motor; a magnetized element disposed on either of the arm or the vehicle and an electromagnet disposed on the other of the arm or the vehicle, wherein the magnetized element is attracted to a magnetic element when the arm is at or near the retracted position; and a current source operatively connected to the electromagnet, the current source providing current to the electromagnet which thereby selectively applies a repelling force in opposition to an attractive force of the magnetized element prior to or during movement of the arm to the extended position.

In further aspects of the apparatus of the invention: the magnetic element is a component of the electromagnet; the magnetic element is disposed on a front surface of the vehicle and the magnetized element is disposed on the arm; the current source comprises current from the drive circuit; the drive circuit comprises a magnetic switch which is open when the magnetized element is in proximity to the electromagnet and closed when the magnetized element is not in proximity to the electromagnet; a magnetic sensor is disposed near the electromagnet for sensing proximity of the magnetized element to the electromagnet during retraction of the arm; the drive circuit provides current to the motor for a predetermined time after the magnetic sensor senses that the magnetized element is proximate to the electromagnet; to extend the arm the arm motor is activated after the magnetized element is repelled from the electromagnet; the magnetized element comprises a permanent magnet; and/or the safety device is a safety gate or a stop arm.

The present invention further provides an apparatus for operating a plurality of safety devices on a vehicle, a first safety device comprising an arm having extended and retracted positions, comprising: respective motors for moving the safety devices between the extended and retracted positions, a drive circuit for operating the motors; a magnetized element disposed on either of the arm or the vehicle and an electromagnet disposed on the other of the arm or the vehicle wherein the magnetized element is attracted to a magnetic element when the arm is at or near the retracted position; and a current source operatively connected to the electromagnet, the current source providing current to the electromagnet which thereby selectively applies a repelling force in opposition to an attractive force of the magnetized element to repel the magnetized element prior to or during movement of the arm to the extended position.

In further aspects of the apparatus of the invention: the magnetic element is a component of the electromagnet; the drive circuit further comprises an inhibit switch which, when depressed, prevents flow of current to the arm motor; a magnetic sensor senses a proximity of the magnetized element to the electromagnet, the sensor disposed near the electromagnet and curtailing current to the arm motor when the magnetized element is near the electromagnet; the drive circuit provides current to the arm motor for a predetermined time after the magnetic sensor senses a proximity of the magnetized element to the electromagnet; the first safety device comprises a crossing gate and a second safety device comprises a stop sign; the magnetized element comprises a permanent magnet; and/or the magnetized element is disposed on the arm and the electromagnet is disposed on a front of the vehicle.

The present invention further provides a method of operating a safety device on a vehicle comprising an arm having extended and retracted positions, comprising the steps of: a. retaining the arm in the retracted position by an attractive force of a magnetized element disposed on one of the vehicle or the arm, and b. selectively providing a current to activate an electromagnet disposed on the other of the vehicle or the arm, thereby applying a repelling force in opposition to the attractive force of the magnetized element.

In further aspects of the method of the invention, the invention comprises the additional steps of: c. moving the arm from a retracted position towards an extended position and thereafter from an extended position to near a retracted position, d. removing the current to the electromagnet, and e. moving the arm to the retracted position; before step a., the additional step of checking whether an inhibit switch is open; the additional step of sensing a proximity of the magnetized element to the electromagnet before moving the arm to the retracted position; moving the arm between the extended position and the retracted position by a motor and a drive circuit for operating the motor, and wherein a current is applied by the drive circuit for a predetermined time period after the proximity of the magnetized element to the electromagnet is sensed.

BRIEF DESCRIPTION OF THE DRAWINGS

In drawings which illustrate by way of example only a preferred embodiment of the invention.

DETAILED DESCRIPTION OF THE INVENTION

Figure 1:
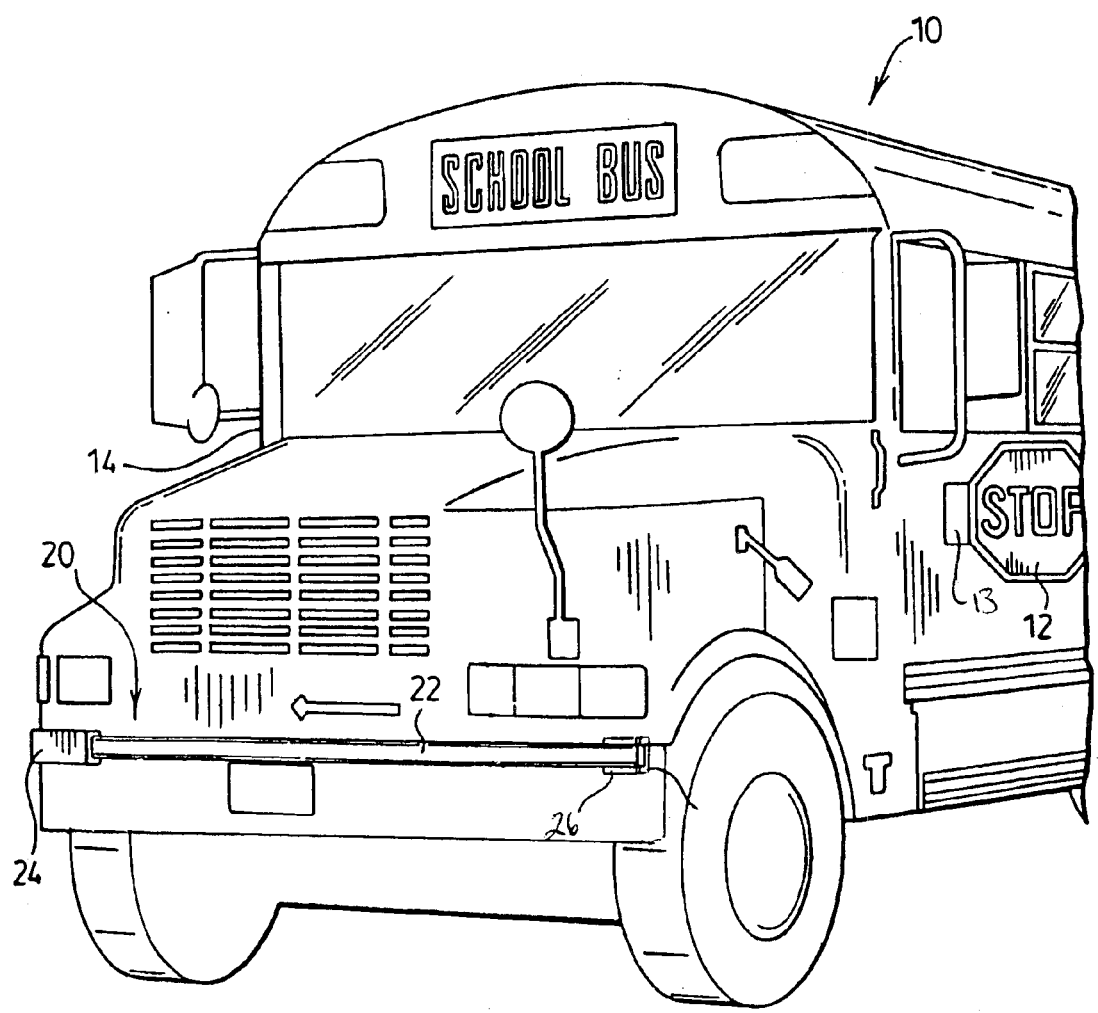
FIG. 1 is a perspective view illustrating the reciprocating arm of the invention mounted to the front of a school bus.

FIG. 1 illustrates a typical school bus 10, having reciprocating safety devices in the nature of a stop sign 12, typically mounted adjacent to the driver's side window, and a crossing gate 20 mounted on the front of the bus 10, typically to the front bumper 16. Both of these safety devices deploy to the extended position when the front door 14 of the bus 10 is opened to take on or discharge passengers. When the front door 14 of the bus 10 is closed, the stop sign 12 and crossing gate 20 are returned to the retracted position. The invention will be described in the context of the crossing gate 20 and stop sign 12, however it will be appreciated that the invention can be applied to other reciprocating or retractable devices and the invention is not limited in this regard.

The crossing gate 20 is mounted to the front of the bus 10 near the door 14. An arm 22 of the crossing gate 20 is sufficiently long that, when extended, it creates a barrier which effectively prevents discharged passengers from walking through the driver's blind spot immediately in front of the bus 10. The gate 20 is mounted to a gate drive motor 24 that deploys and retracts the arm 22, which is typically housed in a sealed housing that in turn is mounted to the exterior of the bus. One suitable mechanism for deploying and retracting a crossing gate of this type, by way of example only, is described in U.S. Pat. No. 5,406,250 issued Apr. 11, 1995 to Reavell et al, which is incorporated herein by reference. FIG. 1 illustrates the retracted position of the gate 20 in solid lines and the extended or deployed position of the gate 20 in phantom lines.

Figure 2:
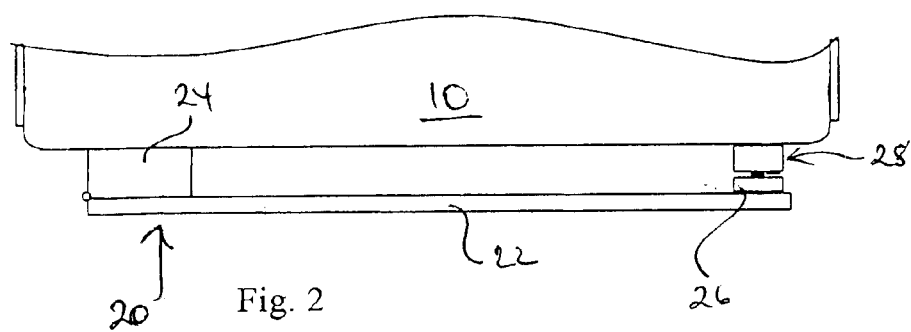
FIG. 2 is a schematic plan view showing the reciprocating arm in the retracted position.

As shown in the preferred embodiment of FIG. 2, there is a magnetized element 26 on the arm 22 and an electromagnet 28 and a magnetic sensor 30 held in a case 32 which is disposed on the bumper 16 or other convenient location at the front of the school bus 10. The magnetized element 26 and the electromagnet 28 are disposed such that the magnetized element 26 attracts a magnetic element, which is advantageously (but not necessarily) a core 28a of the electromagnet 28, when the arm 22 is in the retracted position illustrated in FIG. 2. The magnetized element 26 may be a permanent magnet or any other magnetized material such as a magnetized piece of metal, such that the material will be magnetically attracted to the magnetic element, in the embodiment shown the core of the electromagnet 28, when placed in proximity to the electromagnet 28. The magnetized element 26 may also be an electromagnet, but this is neither necessary nor preferred, as it would require the supply of a constant current in order to retain the gate arm 22 in the retracted position.

Figure 3:
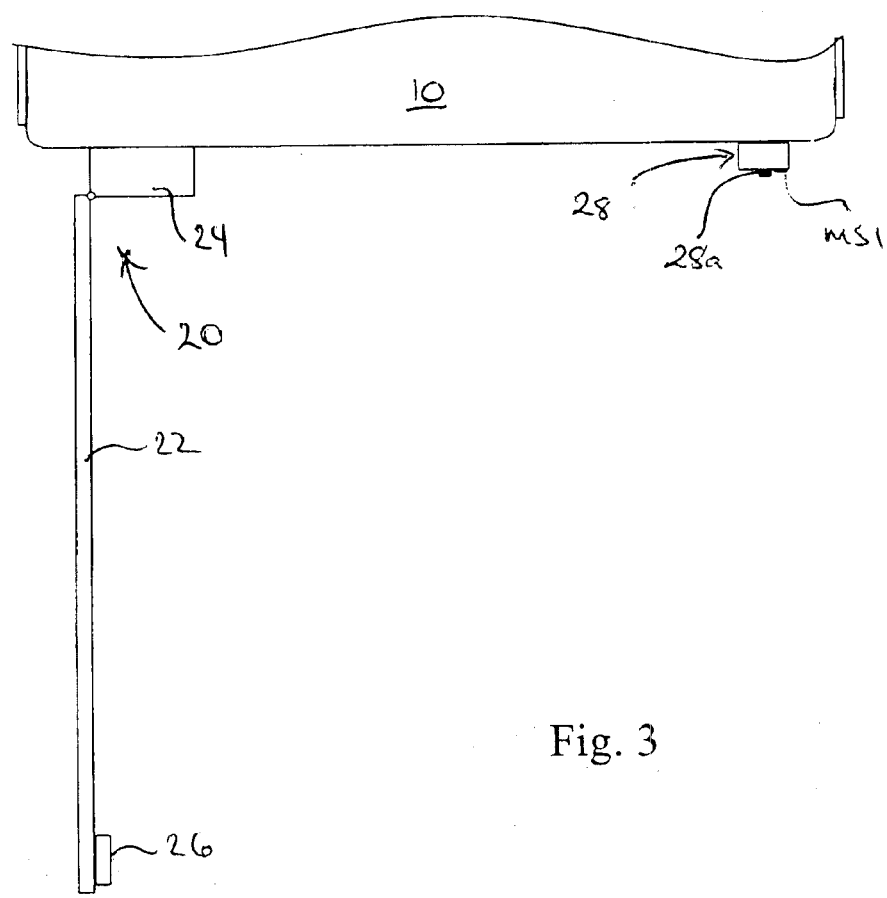
FIG. 3 is a schematic plan view showing the reciprocating arm in the extended position.

Thus, in the deployed or extended position shown in FIG. 3, the gate arm 22 is free of the attractive force of the magnetized element 26 on the electromagnet 28 to thereby allow deployment of the gate 20. In the retracted position shown in FIG. 2, the magnetized element 26 on the arm 22 is aligned with the core of the electromagnet 28, thus restraining the gate 20 from moving out of the retracted position.

While it is preferred that the magnetized element 26 be disposed on the arm 22 and the electromagnet be disposed on the bumper 16, as this simplifies the provision of a current to the electromagnet from the vehicle's electrical system, it is to be understood that the magnetized element 26 could instead be disposed on the bumper 16 and the electromagnet 28 could be disposed on the arm 22. Similarly, while it is preferred that the magnetized element 26 is disposed on the bumper 16 in the case of a crossing gate 20 mounted to the front of the bus 10, it will be appreciated that the electromagnet 28 can be disposed on other parts of the bus 10 or other type of vehicle depending on the location and type of safety device and the invention is not limited in this regard.

Figure 4:
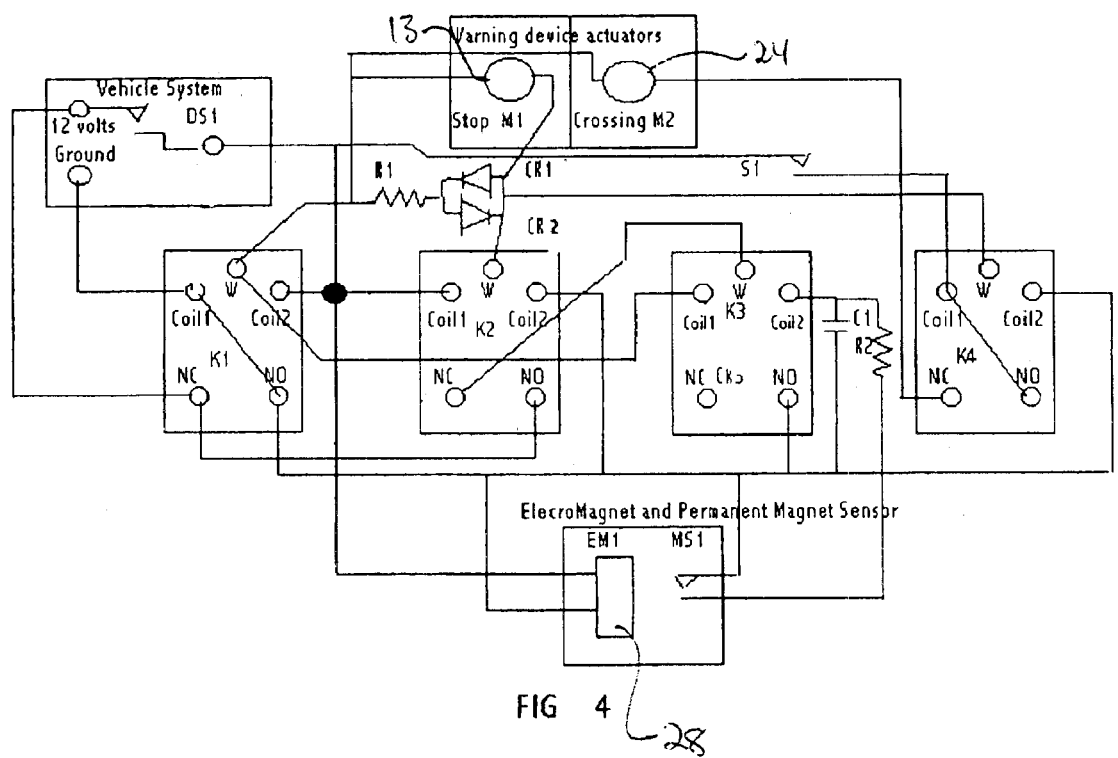
FIG. 4 is a schematic diagram showing the drive circuit.
Figure 1:
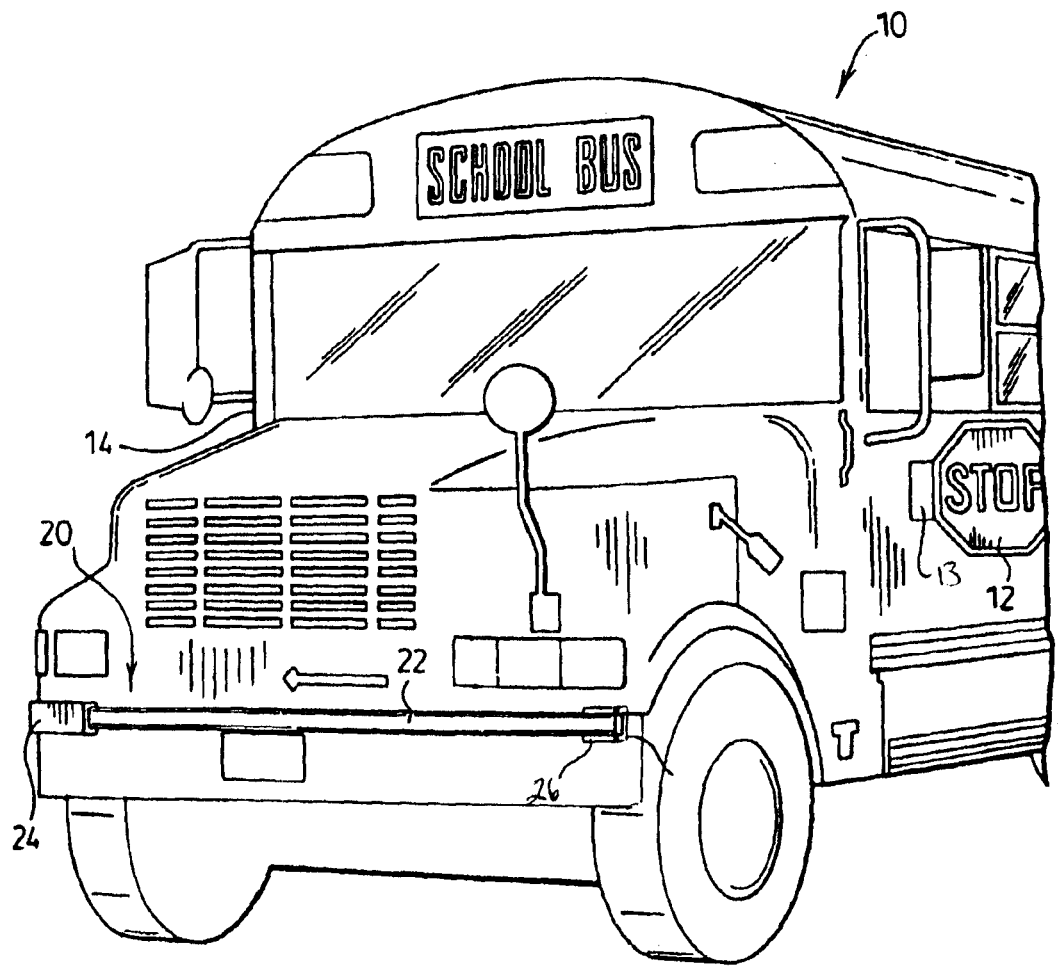
Figure 2:
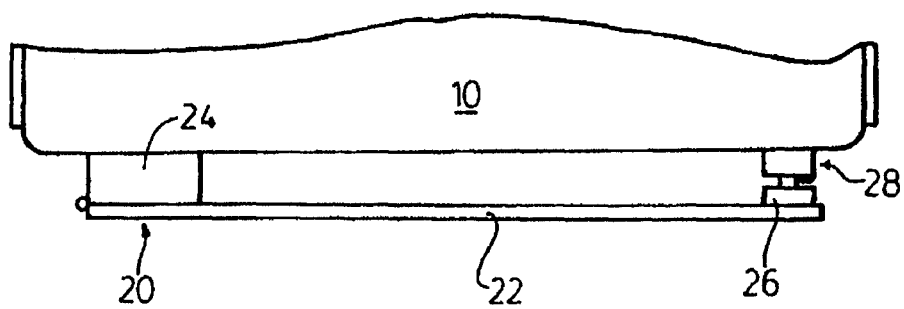
Figure 3:
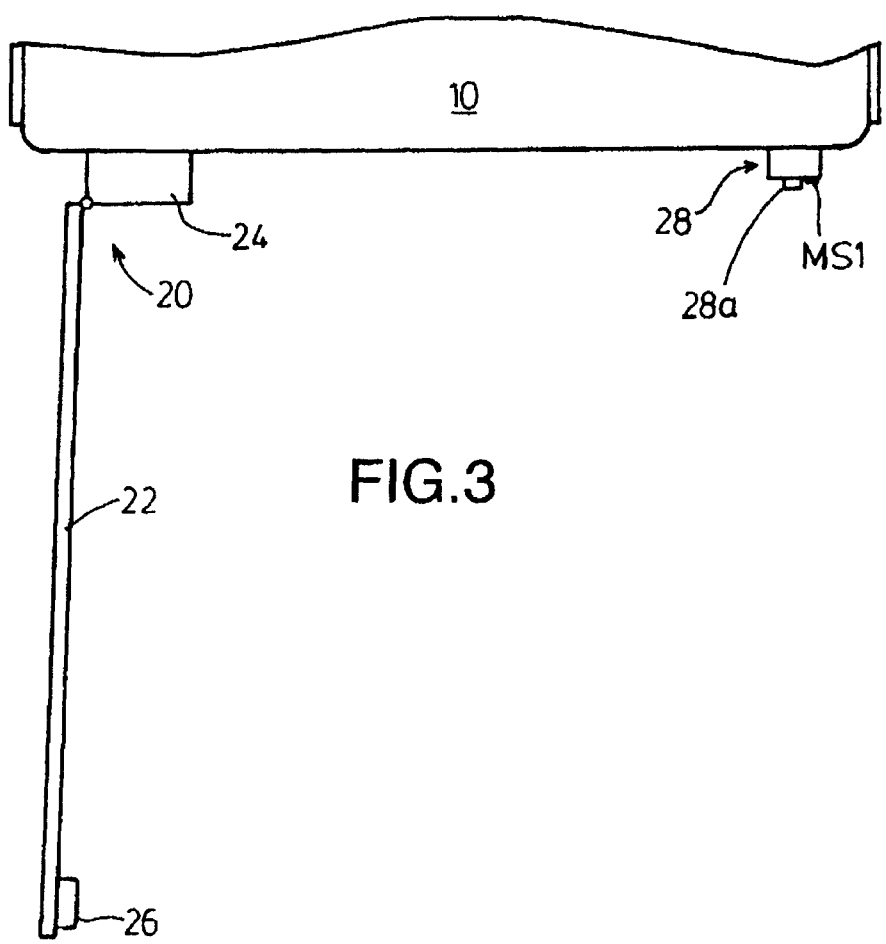
Figure 4:
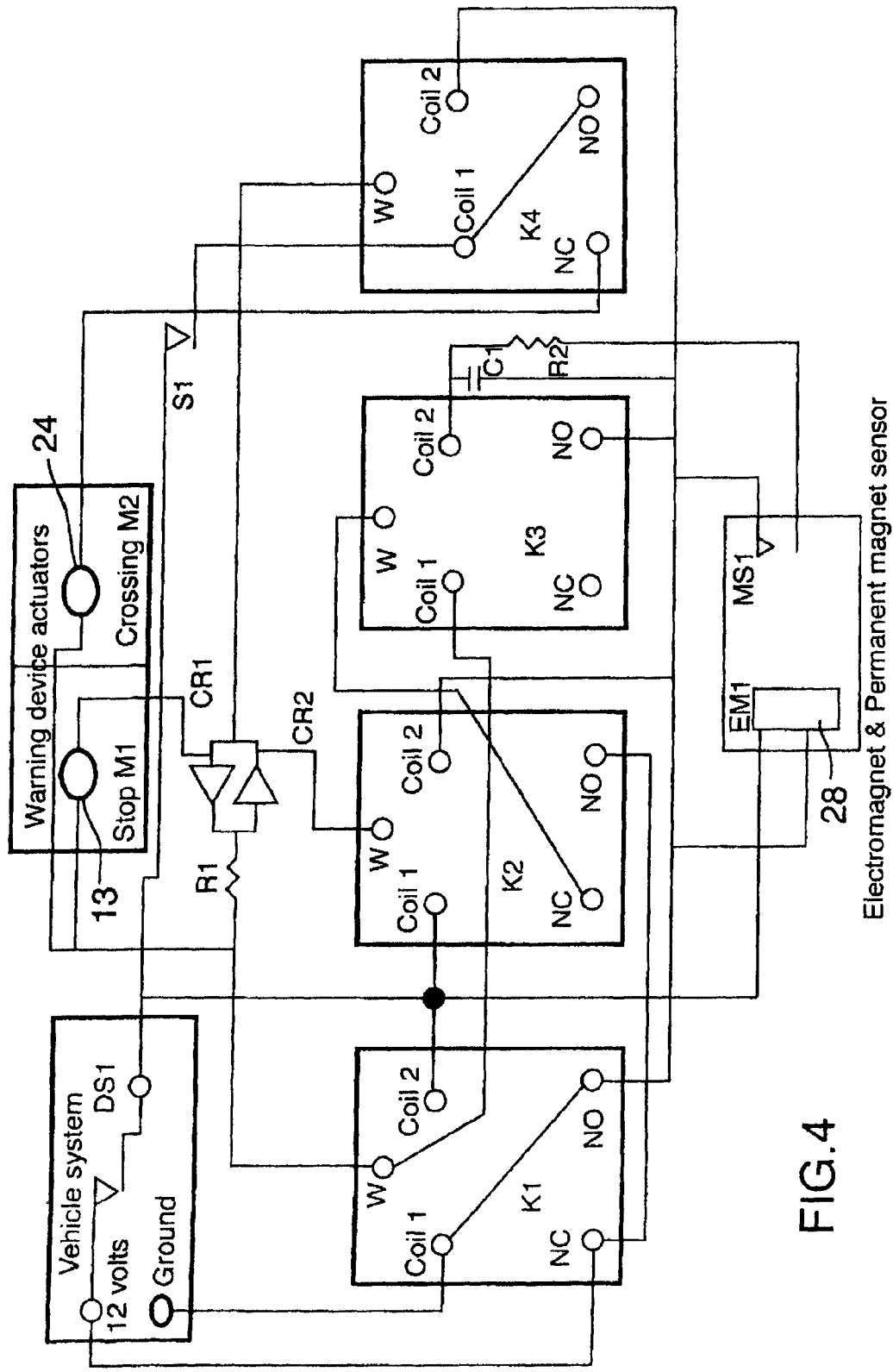

Preferably, the gate drive motor 24 is controlled using a common electrical source, for example the vehicle generator (not shown), and is coupled to a drive circuit 50, illustrated in FIG. 4. In addition, and as will be discussed in more detail below, the stop sign 12 is conveniently activated by the same drive circuit 50 via stop sign motor 13 and the invention is so described, but it will be appreciated that the arm 22 and stop sign 16 can be operated separately and the principles of the invention will then apply in the same fashion to retain the arm 22 in the retracted position.

In one preferred embodiment of the drive circuit 50: C1 is a capacitor, 4700 micro farad 16 volt; CR1 and CR2 are red and green LEDs, respectively; K1, K2, K3, and K4 are relays, each being single pole double throw, having wipers W, normally open contacts NO and normally closed contacts NC; R1 is resistor 1000 ohm ¼ watt; R2 is resister 200 ohm ¼ watt; S1 is a momentary switch, normally open and closing on depression; DS1 is the door switch on the bus that provides 12 volts when the door is open; M1 and M2 are 12 volt motors situated on the warning device actuators; EM1 is the electromagnet, and MS1 is the permanent magnetic sensor situated in proximity to the electromagnet EM1. DS1, M1, M2, MS1 and EM1 are remote from the drive circuit 50, as indicated in FIG. 4 (DS1 can be the door switch ordinarily installed by the vehicle manufacturer).

When the permanent magnet 26 comes close to MS1, MS1 opens. K3 does not drop out until C1 is partially charged up. This delay ensures that the arm 22 is fully retracted. CR1 and CR2 are indicator LEDs for the operator. CR1 (red) indicates arm 22 extending/extended. CR2 (green) indicates arm 22 closing. When CR1 and CR2 are both out, the arm 22 and stop sign 12 are stowed. K1 is picked and held when DS1 is open (i.e. when the door 14 is fully closed), so DS1 passes ground to R1 through K4 wiper, one side (black) of warning device actuator motors M1 and M2, and Coil1 of K3. When DS1 closes as the door 14 opens, K1 passes 12 volts, K2 is picked and held and passes 12 volts to a common junction of LEDs CR1 and CR2, the red side of M1 and the wiper of K4.

When DS1 is opened, K2 passes the level sensed at K3 wiper. K3 is picked and held when both K1 is de-energized and MS1 is closed. During this period K3 provides a ground to K2 NC terminal from K3 wiper. If inhibit switch S1 is held closed when DS1 is closed, K4 is picked until DS1 opens. While K4 is held, the path K2 wiper to M2 red is broken and the crossing arm motor M2 will not activate. If K4 is not picked, the path is complete and crossing arm motor M2 will be activated together with stop arm motor M1. The LED's CR1 and CR2 are low voltage devices, R1 reduces the voltage to these LEDs. When the system is at rest, capacitator C1 is charged up to 12 volts. If the permanent magnet 26 were moved away from MS1 for any reason other than normal system operation, this charge would flow through MS1 and destroy MS1. R2 is accordingly provided to limit the inadvertent discharge of C1 to a safe current level. S1 is the onboard momentary inhibit switch which picks K4 to inhibit M2 in the event that the operator notices an obstruction or otherwise determines that motion of the gate arm 22 should be stopped.

Preferably motors M1 and M2 are low torque and do not require the use of current limiting resistors to limit the current flow when they are stalled. However, a high torque motor could be used for either or both of these motors, which would then require current limiting resistors and a circuit could be installed to delay the application of the resistors until the motors are up to speed. This would provide maximum torque in approximately the first two seconds of initial motor movement.

The drive circuit 50 operates as follows: In the quiescent state all relays are relaxed (i.e. wipers at the NO position). No current is flowing in the drive circuit 50 or the motors 13 and 24. When the door 14 is opened, the control signal +12 volt door switch DS1 goes to 12 volts, relays K1 and K2 are picked and held, and K4 is also picked and held if the inhibit switch S1 is depressed. K1W switches from +12 volts to ground, grounding the ground side of safety gate drive motor 24 and stop arm motor 13 and the ground side of the red and green LED's CR1 and CR2 through the K1 wiper connection to K3. K2 switches the positive side of the stop arm motor 12 to +12 volts and the positive side of the LEDs CR1 and CR2, illuminating the red LED. K2 passes the +12 volt current to K4. If the inhibit switch S1 is not depressed, the +12 volts from K2 will also pass to the positive side of the crossing arm motor 24. CR1 illuminates to indicate to the driver that the crossing gate 20 and stop sign 12 are being deployed.

Motors 13 and 24 immediately rotate at full speed. The magnetic switch MS1 (which is normally closed, and thus open when the magnetized element 26 is in proximity to the electromagnet 28) closes when the magnetized element 26 moves away from the electromagnet 28 and outside of the influence of the magnetic field generated thereby, grounding both sides of K3 coil so the capacitor C1 discharges. Motors 13 and 24 rotate to the full extension position, and stall at the forward stops.

When the door 12 is closed by the driver, the +12 volt signal is removed from the door switch DS1. K1 and K2 drop out and their wipers move back to the NC position. K1 wiper thus goes to +12 volts, which is passed to the ground side of motors 13 and 24 and LED's C1 and C2. The +12 volts from K1 is passed to K3 coil. The magnetic switch MS1 (through resistor R2) holds the other side of the K3 coil to a level that causes K3 to pick and ground the NC contact of K2.

Ground is applied to motor 13 and to motor 24 via NC to W R2. CR2 illuminates to indicate to the driver that the stop sign 12 and gate 20 are retracting. Motors 13 and 24 rotate in the reverse direction.

Motors 13 and 24 rotate at full reverse speed, and encounter their reverse stops (the fully retracted position of the stop sign 12 in the case of motor 13, and the fully retracted position of the gate arm 22 in the case of motor 24), where they stall. As motor 24 reaches its reverse stop, the magnetic switch opens. Capacitor C1 now charges up through the coil of K3. As capacitor C1 approaches +12 volts, K3 drops out and ground is removed from the wiper of K2. Voltage is removed from across both motors 24, 13 and the LED's, so the current goes to floating potential and current flow ceases thru the motors 13 and 24. The indicator CR2 goes out to indicate to the driver that retraction is complete and the circuit 50 is returned to the quiescent state.

Thus, under control of a +12 volt signal, motors 13, 24 rotate until physical forward stops are encountered. When the control signal is negated, motors 13, 24 rotate in the reverse direction until physical reverse stops are encountered. Upon the crossing gate drive motor 24 reaching its fully retracted position, the voltage is removed from the motors 13 and 24.

In an embodiment employing a magnetic sensor 30, the magnetic sensor 30 detects the proximity of the magnetized element 26 as the arm 22 nears the retracted position, and current is thereafter supplied to the motors 13, 24 for a predetermined time period, such as 4 seconds, after which all current to the motors 13, 24 is removed. The magnetized element 26 on arm 22 is attracted to the core of the inactive electromagnet 28, to thus draw the arm 22 tightly against the case 32 and to hold it against any wind or vibration that would tend to cause the arm 22 to move away from the retracted position.

The strength of the magnetized element 26 is selected to provide the desired attractive force, when the gate arm 22 is in the retracted position, to safely restrain the gate arm 22 against inadvertent extension. The strength of the electromagnet 28 is in turn selected to provide a repelling force opposing the attractive force of the magnetized element 26 that is sufficient to enable the safety arm motor 24 to overcome any remaining attractive force of the magnetized element 26 on the magnetic element (which in the embodiment shown is the core of the electromagnet 28) and extend the gate arm 22.

In the preferred embodiment, the gate motor 24 is located in a housing mounted on the exterior of the bus and the drive circuit 50 is housed within the cabin of the vehicle 10. Optionally the drive circuit 50 may provide further LEDs to indicate the state of the safety device; for example, for the crossing gate 20 maybe associated with a green LED to indicate when the gate arm 22 is retracting, and a red LED to indicate when the gate arm 22 is extending.

While the electromagnet repels the permanent magnet away when the door switch is activated, it is understood that a reduced current in the opposite direction when the system is inactive might also be incorporated, thereby augmenting the permanent magnet while the vehicle is being operated.

In operation, while the bus 10 is moving the gate arm 22 is in the retracted position and engaged by the interaction of the magnetized element 26 and core of the quiescent electromagnet 28, as shown in FIG. 2. When the bus 10 stops and the door 12 is opened by the driver, current is passed through to activate the electromagnet 28 as described above. The electromagnet 28 is oriented in an opposite direction relative to the magnetized element 26, to thereby generate a magnetic field with like poles of the magnetized element 26 and electromagnet 28 adjacent to one another. The electromagnet thus repels the magnetized element 26, to (in conjunction with the forward driving force of the motor 24) overcome the attractive force of the magnetized element 26 and allow the arm 22 to extend. The stop sign and gate motors 13 and 24 are activated in the manner described above, causing the gate arm 22 and the stop sign 12 to respectively extend to their extended, or deployed, positions.

Alternatively, as a safety feature, if the inhibit switch S1 is depressed, the gate arm 22 will remain in the retracted position because the +12 volts passed through the inhibit switch S1 picks K4 to move K4 wiper to out of the normally closed position, breaking the circuit to the positive side of gate arm motor 24. In this case, there is about a 4 second delay charging C1 which is used to close the stop are 12 or the gate arm 22.

After passengers have disembarked from the vehicle, the stop sign and gate motors 13, 24 are activated as above causing the gate arm 22 and stop sign 12 to move toward the retracted positions. When the front door 14 is closed, current is removed from the electromagnet 28 and the magnetic sensor 30 senses near proximity of the magnetized element 26. The gate arm motor 24 runs for a predetermined time period after the magnetic sensor 30 detects the magnetized element 26, and the gate arm 22 is stowed in the retracted position and held in place by the attractive force exerted by the magnetic element 26 on the core of the (quiescent) electromagnet 28. The stop arm 12 is also returned to the retracted position by activation of the stop arm motor 13 until the stop arm motor 13 stalls against a physical reverse stop.

Because current must be applied to the electromagnet 28 to repel the magnetized element 26 on the gate arm 22, there is a slight delay in deploying the crossing gate 20. Where the safety device is used together with a stop sign safety device 12 or warning lights, the stop sign 12 and/or warning lights may be activated first, with the current to the electromagnet 30, to warn oncoming motorists to stop. As the stop sign 12 is being deployed, the magnetized element 26 is repelled by the electromagnet 28 and the gate arm 22 is then moved to the extended position by drive motor 24.

Much of the operation of the motor drive circuit 50 can be effected by a microprocessor-based circuit instead of relays, as will be apparent to those skilled in the art. This is a matter for selection and the invention is not intended to be limited thereby.

Various embodiments of the present invention having been thus described in detail by way of example, it will be apparent to those skilled in the art that variations and modifications may be made without departing from the invention. The invention includes all such variations and modifications as fall within the scope of the appended claims.

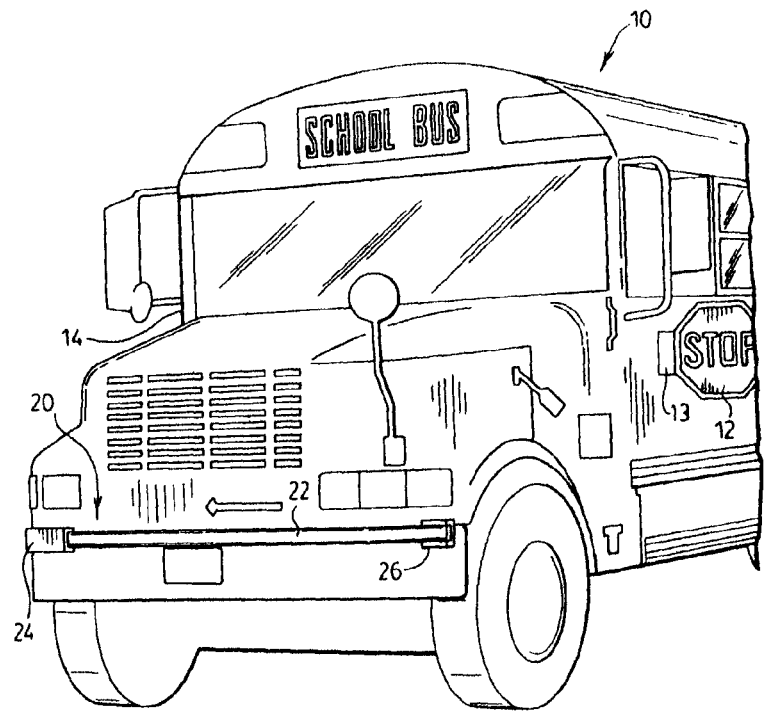

We claim:

1. An apparatus for operating a safety device on a vehicle comprising an arm having extended and retracted positions, comprising:
    a motor for moving the arm between the extended and retracted positions comprising a drive circuit for operating the motor;

a magnetized element disposed on either of the arm or the vehicle and an electromagnet disposed on the other of the arm or the vehicle, wherein the magnetized element is attracted to a magnetic element when the arm is at or near the retracted position; and a current source operatively connected to the electromagnet, the current source providing current to the electromagnet which thereby selectively applies a repelling force in opposition to an attractive force of the magnetized element prior to or during movement of the arm to the extended position.

2. The apparatus of claim 1 wherein the magnetic element is a component of the electromagnet.

3. The apparatus of claim 1 wherein the electromagnet is disposed on a front surface of the vehicle and the magnetized element is disposed on the arm.

4. The apparatus of claim 1 wherein the current source comprises current from the drive circuit.

5. The apparatus of claim 4 wherein the drive circuit comprises a magnetic switch which is open when the magnetized element is in proximity to the electromagnet and closed when the magnetized element is not in proximity to the electromagnet.

6. The apparatus of claim 2 further comprising a magnetic sensor disposed near the electromagnet for sensing proximity of the magnetized element to the electromagnet.

7. The apparatus of claim 6 wherein the drive circuit provides current to the motor for a predetermined time after the magnetic sensor senses that the magnetized element is proximate to the electromagnet.

8. The apparatus of claim 1 wherein to extend the arm the arm motor is activated after the magnetized element is repelled from the electromagnet.

9. The apparatus of claim 1 wherein the magnetized element comprises a permanent magnet.

10. The apparatus of claim 1 wherein the safety device is a safety gate or a stop arm.

11. An apparatus for operating a plurality of safety devices on a vehicle, a first safety device comprising an arm having extended and retracted positions, comprising:

respective motors for moving the safety devices between the extended and retracted positions, a drive circuit for operating the motors;

a magnetized element disposed on either of the arm or the vehicle and an electromagnet disposed on the other of the arm or the vehicle wherein the magnetized element is attracted to a magnetic element when the arm is at or near the retracted position; and a current source operatively connected to the electromagnet, the current source providing current to the electromagnet which thereby selectively applies a repelling force in opposition to an attractive force of the magnetized element to repel the magnetized element prior to or during movement of the arm to the extended position.

12. The apparatus of claim 11 wherein the magnetic element is a component of the electromagnet.

13. The apparatus of claim 11 wherein the drive circuit further comprises an inhibit switch which, when depressed, prevents flow of current to the arm motor.

14. The apparatus of claim 11 further comprising a magnetic sensor for sensing a proximity of the magnetized element to the electromagnet, the sensor disposed near the electromagnet and curtailing current to the arm motor when the magnetized element is near the electromagnet.

15. The apparatus of claim 14 wherein the drive circuit provides current to the arm motor for a predetermined time after the magnetic sensor senses a proximity of the magnetized element to the electromagnet.

16. The apparatus of claim 11 wherein the first safety device comprises a crossing gate and a second safety device comprises a stop sign.

17. The apparatus of claim 11 wherein the magnetized element comprises a permanent magnet.

18. The apparatus of claim 11 wherein the magnetized element is disposed on the arm and the electromagnet is disposed on a front of the vehicle.

19. A method of operating a safety device on a vehicle comprising an arm having extended and retracted positions, comprising the steps of:

a. retaining the arm in the retracted position by an attractive force of a magnetized element disposed on one of the vehicle or the arm, and b. selectively providing a current to activate an electromagnet disposed on the other of the vehicle or the arm, thereby applying a repelling force in opposition to the attractive force of the magnetized element.

20. The method of claim 19 comprising the additional steps of:

c. moving the arm from a retracted position towards an extended position and thereafter from an extended position to near a retracted position;

d. removing the current to the electromagnet; and e. moving the arm to the retracted position.

21. The method of claim 19 comprising, before step a., the additional step of checking whether an inhibit switch is open.

* * * * *

UNITED STATES PATENT AND TRADEMARK OFFICE
CERTIFICATE OF CORRECTION

PATENT NO. : 6,894,604 B2
APPLICATION NO. : 10/609517
DATED : May 17, 2005
INVENTOR(S) : William R. Phillips et al.

Page 1 of 5

It is certified that error appears in the above-identified patent and that said Letters Patent is hereby corrected as shown below:

The title page should be deleted to appear as per attached title page.

The sheet of drawings consisting of figures 1-4 should be deleted to appear as per attached figs. 1-4.

INSERT the following claims 22 and 23 as originally filed:

--22. The method of claim 20 further comprising the additional step of sensing a proximity of the magnetized element to the electromagnet before moving the arm to the retracted position.--

--23. The method of claim 22 wherein the arm is moved between the extended position and the retracted position by a motor and a drive circuit for operating the motor, and wherein a current is applied by the drive circuit for a predetermined time period after the proximity of the magnetized element to the electromagnet is sensed.--

Signed and Sealed this

Twenty-third Day of March, 2010

David J. Kappos
*Director of the United States Patent and Trademark Office*

United States Patent
Phillips et al.

(10) Patent No.: US 6,894,604 B2
(45) Date of Patent: May 17, 2005

(54) METHOD AND APPARATUS FOR OPERATING A VEHICLE SAFETY ARM

(75) Inventors: William R. Phillips, Belleville (CA); James A. Reavell, Campbellford (CA)

(73) Assignee: B.M.R. Mfg. Inc., Campbellford (CA)

(*) Notice: Subject to any disclaimer, the term of this patent is extended or adjusted under 35 U.S.C. 154(b) by 1 day.

(21) Appl. No.: 10/609,517

(22) Filed: Jul. 1, 2003

(65) Prior Publication Data

US 2004/0232859 A1 Nov. 25, 2004

(30) Foreign Application Priority Data

May 21, 2003 (CA) .................................. 2429282

(51) Int. Cl.[7] .................................................. B60Q 1/26
(52) U.S. Cl. .................. 340/433; 340/425.5; 340/468; 335/209; 180/271; 180/281; 280/764.1
(58) Field of Search .................. 340/930, 433, 340/480, 487–490, 648, 686.1; 318/626, 266, 282; 335/65, 68, 78, 205, 230

(56) References Cited

U.S. PATENT DOCUMENTS

| | | | |
|---|---|---|---|
| 3,863,214 A | * | 1/1975 | Kerr, Jr. .................. 340/932.1 |
| 4,559,518 A | * | 12/1985 | Latta, Jr. .................. 340/433 |
| 4,697,541 A | * | 10/1987 | Wicker .................. 116/28 R |
| 4,816,804 A | | 3/1989 | Reavell |
| 5,132,662 A | * | 7/1992 | Burch .................. 340/433 |
| 5,357,239 A | * | 10/1994 | Lamparter .................. 340/433 |
| 5,406,250 A | | 4/1995 | Reavell et al. |
| 5,635,902 A | * | 6/1997 | Hochstein .................. 340/433 |
| 5,812,052 A | * | 9/1998 | Swanger et al. .................. 340/433 |
| 6,765,481 B2 | * | 7/2004 | Haigh et al. .................. 340/433 |
| 2003/0061982 A1 | | 4/2003 | Phillips et al. |

* cited by examiner

*Primary Examiner*—Daniel Wu
(74) *Attorney, Agent, or Firm*—Dimock Stratton LLP; Mark B. Eisen

(57) ABSTRACT

An apparatus for operating a reciprocating arm vehicular safety device with a magnetized element for preventing inadvertent deployment of the reciprocating arm. The apparatus has a magnetized element on the arm and an electromagnet on a vehicle bumper, the magnetized element and electromagnet disposed so as to engage the arm in a retracted position. When the reciprocating arm is moved to an extended position, current is passed through the electromagnet to repel the magnetized element, thereby allowing the arm to move to the extended position by a motor.

21 Claims, 3 Drawing Sheets